United States Patent [19]

Funayama et al.

[11] Patent Number: 4,794,222
[45] Date of Patent: Dec. 27, 1988

[54] LASER BEAM MACHINING APPARATUS

[76] Inventors: Manabu Funayama, No. 3322-17, Kamijima, Tonami-shi, Toyama; Yoshinobu Sawada, No. 1472, Sanohonmachi, Takaoka-shi, Toyama, both of Japan

[21] Appl. No.: 68,008

[22] Filed: Jun. 30, 1987

[30] Foreign Application Priority Data

Jun. 30, 1986 [JP] Japan .................. 61-154472
Aug. 18, 1986 [JP] Japan .................. 61-192256
Oct. 28, 1986 [JP] Japan .................. 61-257933

[51] Int. Cl.$^4$ .................................. B23K 26/02
[52] U.S. Cl. .................. 219/121.78; 219/121.83; 219/121.79; 219/121.74
[58] Field of Search .............. 219/121 LU, 121 LV, 219/121 L, 121 LM, 121 LQ, 121 LV, 121 LZ, 121 LC, 121 LD, 121 LH, 121 LJ, 121 LG, 121 LN

[56] References Cited

U.S. PATENT DOCUMENTS

| | | | |
|---|---|---|---|
| 3,696,230 | 10/1972 | Friedrich | 219/121 FS X |
| 3,986,767 | 7/1976 | Rexer | 219/121 L X |
| 4,174,154 | 7/1979 | Kawasaki | 219/121 L X |
| 4,298,784 | 1/1981 | Schmall | 219/124.02 |
| 4,465,919 | 4/1984 | Roder | 219/121 LG |
| 4,539,462 | 10/1985 | Plankenhorn | 219/121 LV |

FOREIGN PATENT DOCUMENTS

| | | | |
|---|---|---|---|
| 0224091 | 12/1983 | Japan | 219/121 LU |
| 0021491 | 2/1984 | Japan | 219/121 LQ |
| 0054487 | 3/1984 | Japan | 219/121 LZ |

*Primary Examiner*—C. L. Albritton
*Attorney, Agent, or Firm*—Sughrue, Mion, Zinn, Macpeak, and Seas

[57] ABSTRACT

A laser beam machining head of the present invention includes a head supporting member, a first rotating bracket member for guiding a laser beam with the first rotating member being rotatable about a first axis with respect to the head supporting member. A second rotating bracket member guides the laser beam from the first rotating bracket member. The second rotating bracket member is rotatable with respect to the first rotating bracket member about a second axis, the second axis crossing the first axis at a fixed point with a predetermined angle. A laser beam concentrator concentrates the laser beam entering from the second bracket member and projects the beam to the fixed point where the first axis crosses the second rotational axis.

19 Claims, 8 Drawing Sheets

LASER BEAM MACHINING APPARATUS

BACKGROUND OF THE INVENTION

1. Field of the Invention

The present invention relates to a laser beam machining apparatus. More particularly, the present invention relates to a laser beam machining apparatus that is designed to machine a workpiece with curved surfaces and which is capable of adjusting the height of a laser beam emitting nozzle in such a manner that the distance between the tip of the nozzle and the workpiece as detected with a distance sensor such as a sensor for detecting electrostatic capacitance therebetween will be held constant.

2. Background of the Invention

For a laser beam machining apparatus of the type contemplated by the present invention, it is necessary that the laser beam emitting nozzle be controlled to always have the proper attitude with respect to the workpiece while the laser beam is focused at a constant point on the work. To meet these requirements, the conventional art employs a sensor that is installed at or near the tip of the nozzle for detecting the distance (the amount of gap) between the nozzle tip and the workpiece, with the nozzle being moved so as to keep the nozzle-to-work distance (or gap) constant, thereby permitting the laser beam to be properly focused on the work surface.

If the laser beam machining apparatus of interest is solely intended to machine flat plates, controlling the nozzle-to-work gap is very easy to accomplish because it usually involves moving the nozzle relative to the work surface only in the vertical direction. However, in an apparatus for three-dimensional machining, it involves complicated procedures to control the position and attitude of the nozzle since the control must be effected in a three-dimensional fashion. The complexity of the control system will be further increased if one wants to control the amount of the gap between nozzle and work surface on a real-time basis and to achieve rapid response to variations in the gap. Furthermore, attempts to satisfy these needs have often introduced instability in the operation of the servo system and resulted in failure to ensure high-speed and reliable machining.

Japanese Patent Application (OPI) No. 44487/1982 (the term "OPI" as used herein means an unexamined published Japanese patent application) proposes a capacitive sensor in the form of an annular electrode fixed around the tip of the laser-emitting nozzle, and Japanese Patent Application (OPI) No. 54487/1984 shows a capacitive sensor in the form of a separate electrode embedded in the tip of the nozzle. These sensors perform contactless detection of the capacitance (electrostatic capacity) between the electrode and the surface of the work W and by controlling the height of the nozzle with a servo mechanism so that the sensor will produce a constant output, the distance between the work W and the nozzle can be held constant. This method, which enables contactless detection of the nozzle-to-work distance has proved very effective in the machining of a workpiece in flat plate form.

However, if the surface of work W has a complexly curved configuration with many high spots and recesses, the nozzle with the annular sensor is unable to gain access to very narrow valleys in the surface of the work W, with the result that some part of the work is left unmachined.

The nozzle having a separate sensor attached to the nozzle tip has such a geometry that it can have access to valleys in the surface of the work W as shown in FIG. 14. However, as the nozzle is brought close to the wall of the valley, the changes in the capacitance $C_x$ between the lateral side of the nozzle (i.e., the lateral side of electrode A) and the work W and in the capacitance $C_Y$ between the work W and a conductor wire a to the electrode A are added to the capacitance $C_L$ between the end face of electrode A and the work W which is to be measured for correct control of the nozzle-to-work distance. As a consequence, the capacitance detected by the sensor is greater than $C_L$ and the height of the nozzle is improperly controlled to a position that is offset from the desired height, with the result that laser beam machining cannot be accomplished at all or significant variations are introduced in the quality of the machined workpiece. Since the values of $C_X$ and $C_Y$ vary with the three-dimensional geometry of the work W, the correct amount of nozzle-to-work gap cannot be detected and the height of the nozzle relative to the work W cannot be held constant for the purpose of maintaining optimum machining conditions.

SUMMARY OF THE INVENTION

An object of the present invention is to provide a laser beam machining apparatus that is capable of not only controlling the laser beam emitting nozzle to have any desired attitude with respect to curved surfaces of a workpiece but also maintaining a constant distance between the nozzle and the work to ensure consistent laser beam machining.

Another object of the present invention is to provide a laser beam machining apparatus that does not require any nozzle-moving drive unit to be mounted at the nozzle tip (this eliminates exertion of weight on the nozzle tip and permits the tip to have a sharp point) and which enables the height of the nozzle to be adaptively controlled using a simple construction and without the need to use any complex control system.

In order to attain these objects, the laser beam machining apparatus of the present invention comprises: a head supporting member; a first rotating bracket member for guiding laser beam, the first rotating member being supported on the head supporting member and rotatable about a first axis with respect to the head supporting member; a second rotating bracket member for the guiding laser beam from the first rotating bracket member, the second rotating bracket member being supported on the first rotating bracket member and rotatable with respect to the first rotating bracket member about a second axis, the second axis crossing the first axis at a fixed point with a predetermined angle; laser beam concentrating means for concentrating the laser beam entered from the second bracket member and projecting the beam to the fixed point where the first axis crosses the second axis; and retainer means for retaining the laser beam concentrating means, the retainer means being movable with respect to the second rotating bracket member in an optical axis direction of the laser beam passed through the laser beam concentrating means, to thereby perform focusing adjustment of the beam on a workpiece to be machined. In other words, the laser machining apparatus of the present invention supports a workpiece and a laser-beam emitting machining head in such a manner that they can be numerically controlled in three-dimensional directions and, in addition, the apparatus supports the machining head in such a way that it is not only movable along the three axes associated with the three-dimensional directions but also rotatable about two rotational axes. Stated more specifically, the head comprises two rotating brackets, and the first bracket is rotatably supported on one of the three axes associated with the three-dimensional directions, say, the X-axis, with the second bracket being rotatable not only about a second axis that crosses the first axis at a predetermined angle but also with respect to the first rotating bracket. Each of these first and second rotating brackets is hollow and a laser beam introduced into these brackets is deflected several times before it is projected at a desired machining point, or the point at which the first axis crosses the second axis. As a consequence, irrespective of the directions in which the first and second rotating brackets are rotated, the laser beam will always be directed toward the machining point, or the point at which the first axis crosses the second axis.

The machining head of the present invention is also equipped with a drive unit and a link mechanism; the drive unit is used to control the position of a nozzle retaining tube and is accommodated within the space between the first and second rotating brackets, and the link mechanism is disposed outside of the second rotating bracket and couples the drive unit to the nozzle retaining tube.

A further object of the present invention is to provide a laser machining apparatus that enables a constant electrostatic capacitance to be always detected from the lateral side of a laser beam emitting nozzle and which permits a work having a complexly curved surface to be machined by detecting correctly the change in the electrostatic capacitance between the work and the end surface of the nozzle tip, with the subsequent result that the laser beam can be focused at a constant position on the work surface by controlling the height of the nozzle so as to maintain a constant value of the electrostatic capacitance.

A still further object of the present invention is to provide a laser beam machining apparatus which, in addition to the features described above, has a capability of easy nozzle replacement in the nozzle holder.

In order to attain these objects, the present invention employs the tip of the laser-emitting nozzle as a first electrode and covers the lateral side portion, except the tip, of the nozzle with a second electrode, with an insulating portion being disposed therebetween, so that the lateral side portion of the first electrode is electromagnetically shielded from the work. In other words, a nozzle for a laser beam machining apparatus of the present invention comprises: first electrode layer for detecting electrostatic capacitance between the tip end of the first electrode layer and a workpiece to be machined, the first electrode layer extending along an inner side portion of the nozzle body to a tip end portion thereof; second electrode layer for electrically shielding a lateral side portion of the first electrode layer from the workpiece, the second electrode layer being provided on the outer lateral side portion, except the tip end portion, of the first electrode layer; and insulating layer provided between the first and second electrode layers for electrically insulating the first and second electrode layers from each other.

According to another aspect of the present invention, a laser beam projection nozzle equipped with a first electrode for detecting the electrostatic capacity between the tip of the nozzle and the work and a second electrode for establishing an electromagnetic shield between the lateral side portion of the nozzle and the work is detachably fitted into a nozzle holder that is equipped with a first conductive member connected to an electrostatic capacity detector and a second conductive member connected to a point having the same electric potential as the work, and the nozzle can be secured to the holder by simply tightening the nozzle nut that is threaded over the nozzle holder.

DETAILED DESCRIPTION OF THE PREFERRED EMBODIMENTS

The preferred embodiemnts of the present invention will be described in greater detail hereinafter.

Figure 1:
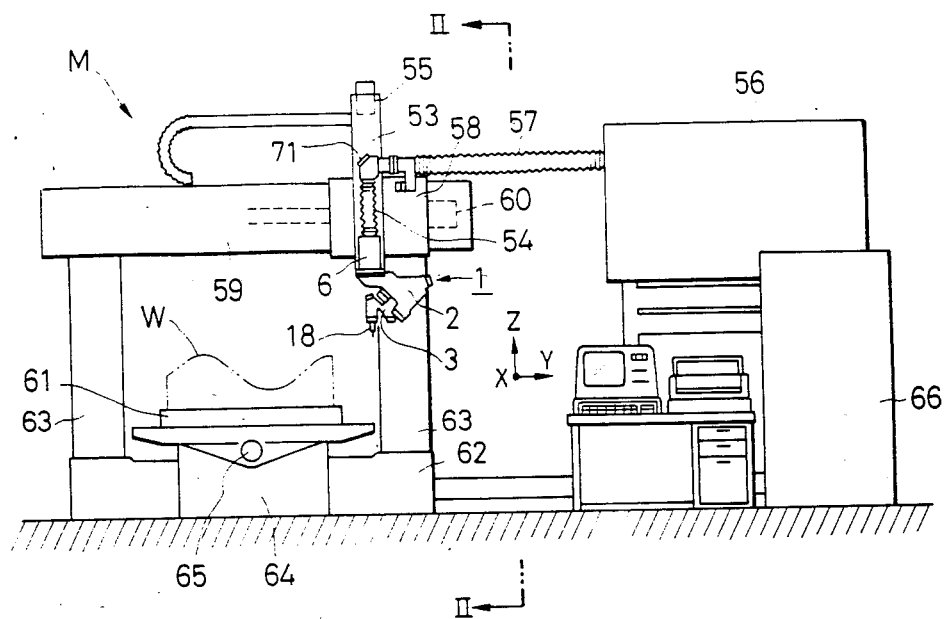
FIG. 1 is a front view of a laser machining apparatus according to one embodiment of the present invention.
Figure 2:
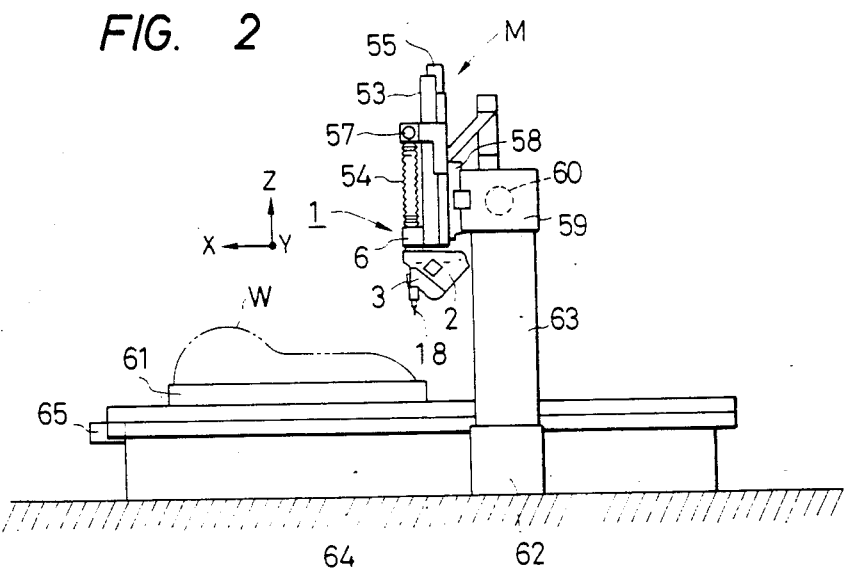
FIG. 2 is a section of FIG. 1 taken on line II—II.

FIGS. 1 and 2 show the general layout of the laser machining apparatus M of the present invention.

The machining head 1 of the apparatus M is mounted by means of a support frame 6 on a slider 53 that is capable of moving up and down (i.e., in the direction of z-axis). The slider 53 is supported on a saddle 58 in such a manner that it is movable in the direction of z-axis. The saddle 58 is movable horizontally (in the direction of y-axis) along a cross beam 59 that is retained horizontally on two erect columns 63 and 63. The vertical position of the slider 53 is determined by such means as a servo motor 55 fixed to the saddle 58 and a known feed screw unit (not shown).

The saddle 58 is driven in the direction of y-axis by means of a servo motor 60 fixed to the cross beam 59 and a feed screw unit (not shown). The cross beam 59, riding over a bed 64 that extends in the direction of x-axis, is supported by the columns 63 and 63 erected on a base 62.

A table 61 is supported on the bed 64 in such a manner that it is movable in the direction of x-axis. The table 61 is driven in the direction of x-axis by means of a servo motor 65 fixed to the bed 64 and a feed screw unit (not shown). A workpiece W is rested on the table 61 in a fixed state. The servo motors 55, 60 and 65 are driven by a control unit 66 so as to move the head 1 in either y- or z-direction and the work W in x-direction. A laser beam L from a laser oscillator 56 passes through an expandable bellows guide pipe 57 and is deflected downwardly by means of a beam bender 71 fixed to the saddle 58 so that it is directed to a first axis A through an expandable bellows guide pipe 54.

The details of the machining head 1 are shown in FIGS. 3 to 6. This head is basically composed of the support frame 6, a first rotating bracket 2, and a second rotating bracket 3.

Figure 4:
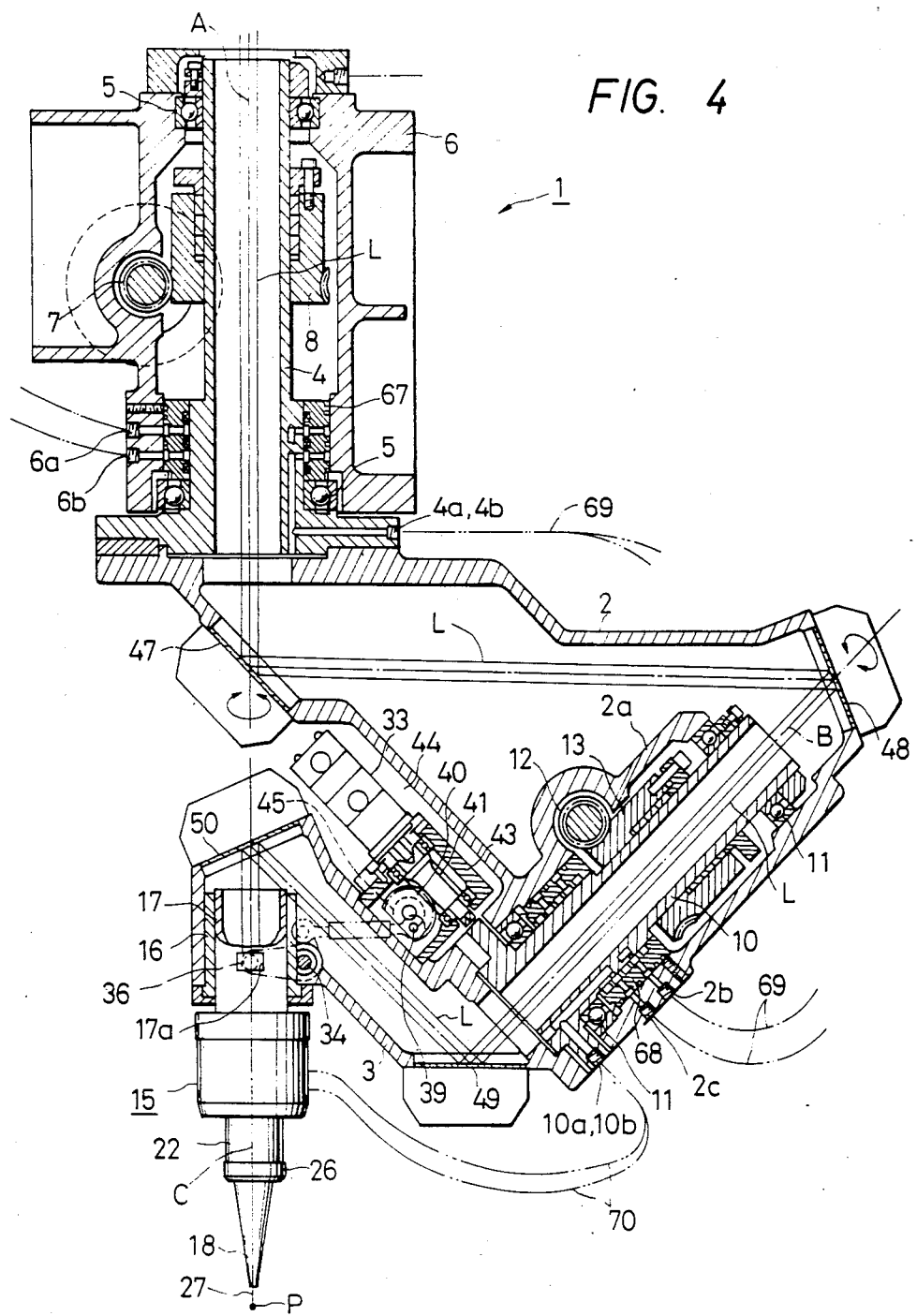

As is clear from FIG. 4, the first rotating bracket 2 is in a hollow form with a predetermined shape and its top end is secured by means of a screw (not shown) to the bottom end of a first hollow shaft 4. The hollow shaft 4 is rotatably retained in the support frame 6 by means of a top and a bottom ball bearing 5 and 5. The bracket 2 is rotatably supported about the first axis A. The first hollow shaft 4 is adapted to be driven by a first servo motor 9 (fixed outside of the support frame 6) through a transmission mechanism consisting of a worm 7 and a worm wheel 8 within the frame 6.

The second rotating bracket 3 is mounted in such a way that one end thereof is secured to the bottom end of a second hollow shaft 10 that is rotatably supported about a second axis B in the first rotating bracket 2 by means of ball bearings 11 and 11. The bracket 3 is adapted to be driven by the combination of a worm 12, a worm wheel 13 and a second servo motor 14 fixed to the first rotating bracket 2. The bracket 3 retains at the other end thereof a light-concentrating means 15 and a nozzle 18, the means 15 having a concentrating lens 19 in its interior.

The second rotating bracket 3 also has at its other end a guide tube 16 fixed thereto, with a nozzle retainer tube 17 being fitted in the tube 16 in such a manner that it is slidable only in the direction of optical axis. The light-concentrating means 15 and the nozzle 18 are retained en masse in the tube 17.

The first rotating bracket 2 also has a reflective mirror 47 fixed below the first hollow shaft 4. The mirror 47 may be inclined by 45° with respect to the first axis A. A reflective mirror 48 is fixed, with facing the mirror 47, at the end of the second hollow shaft 10 in the first rotating bracket 2 at which the laser beam L reflects and enters in the hollow shaft 10. The second rotating bracket 3 has two reflective mirrors 49 and 50. The mirror 49 is fixed at the end of the second hollow shaft 10 where the laser beam L comes out from the hollow shaft 10, with the mirror 49 being inclined by 45° with respect to the axis B, and the mirror 50 is fixed, with facing the mirror 49 at the end of the retainer tube 17 where the laser beam L reflects and enters into the tube 17.

Figure 3:
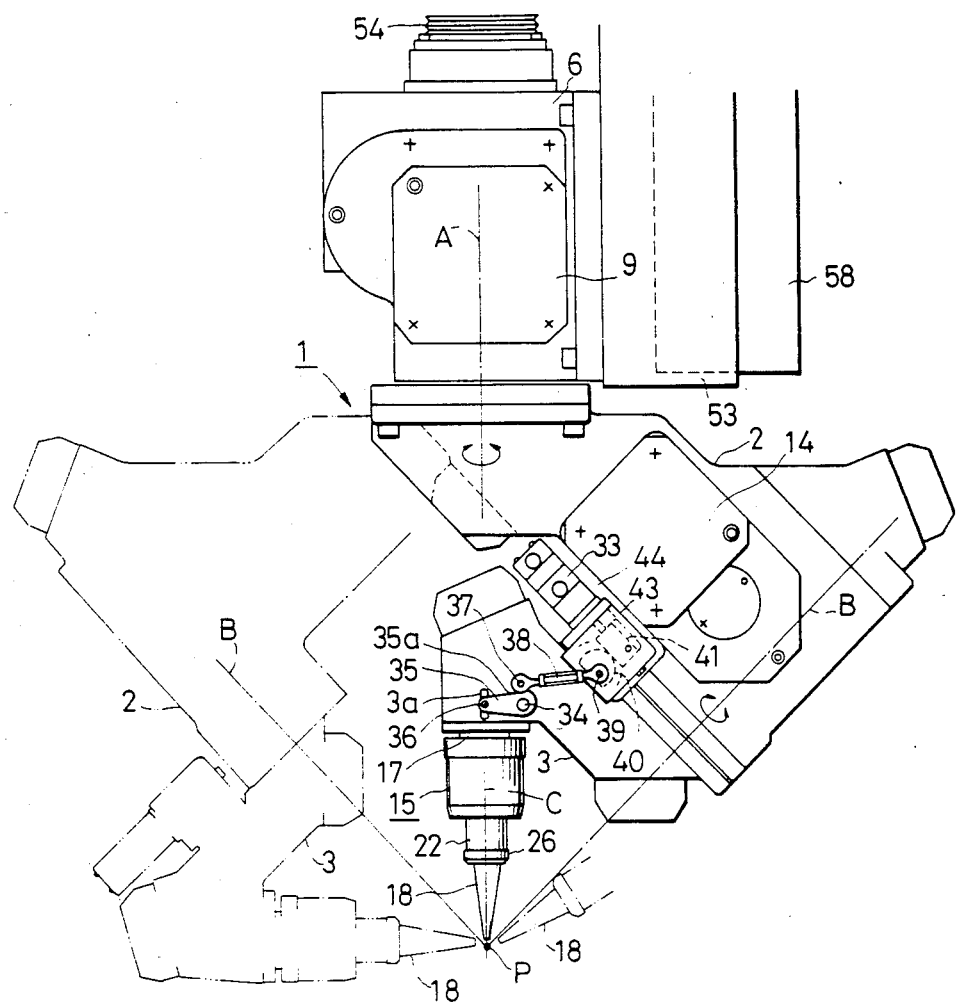
FIGS. 3 and 4 are front and sectional views, respectively, of a machining head according to the present invention.

In FIGS. 3 and 4, the first rotating bracket 2 and second rotating bracket 3 are shown to lie in the same plane, with the center line C of the retainer tube 17 and the nozzle 18 being in alignment with the first axis A. In this arrangement, the laser beam L incident on top of the first hollow shaft 4 travels along the first axis A, and is reflected from the reflective mirror 47 to travel toward the reflective mirror 48 in the first rotating bracket 2, from which the beam is reflected to travel along the second axis B. The beam is directed to the reflective mirror 49 which is mounted on the axis B in the bracket 3 and from that mirror the beam is reflected to travel toward the mirror 50, which directs the beam to pass through the light-concentrating means 15 and an ejection hole 27 in the nozzle 18 so that it is projected to point F of the work W to be machined. Therefore, each of the reflective mirrors 47, 48, 49 and 50 provides a laser beam guide means.

The machining head 1 constructed in the manner described above has the advantage that even if the direction of the surface of the work W to be irradiated with the laser beam is changed and the first rotating bracket 2 and the second rotating bracket 3 are rotated by suitable angles about the first and second axis A and B, respectively, the point of irradiation F can be held constant.

Figure 6:
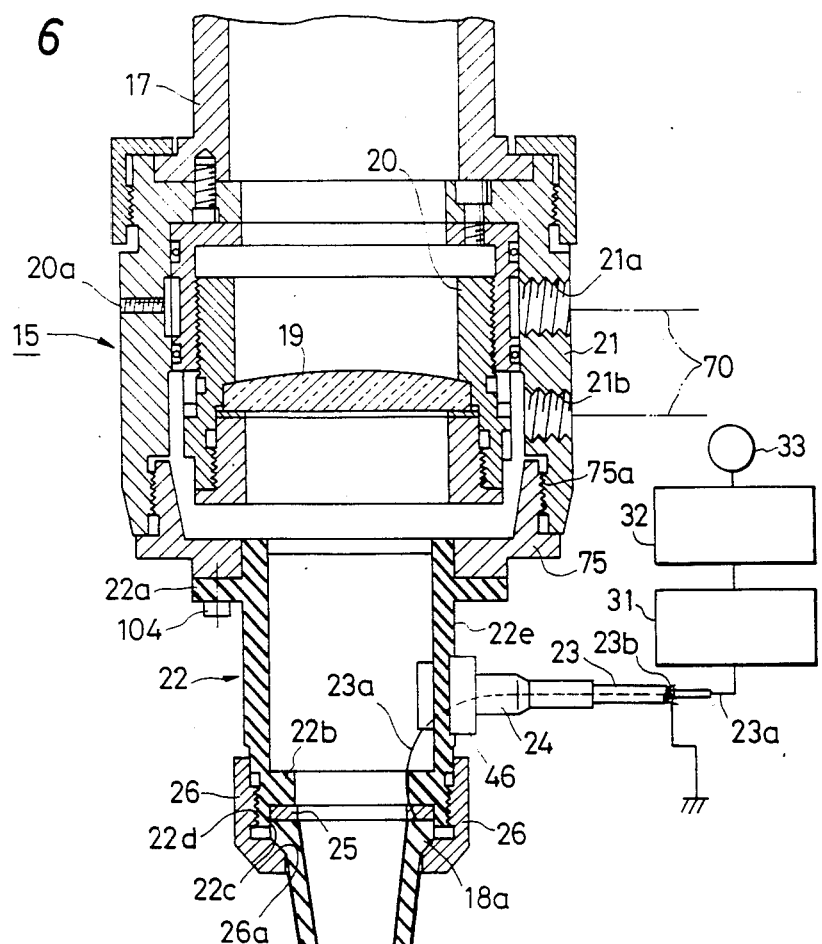
FIG. 6 is an enlarged section showing how light-concentrating means and a laser-emitting nozzle are coupled in the machining head.

As shown in detail in FIG. 6, the light-concentrating means 15 consists essentially of a lens mount 20 holding the concentrating lens 19 in its interior and a housing 21 that is disposed around the lens mount 20 for helping it to be mounted on the retainer tube 17. The housing 21 is provided with an inlet 21a through which air for cooling the lens and other components is to be supplied and with an assist gas feed inlet 21b. An assist gas fed in through the inlet 21b will be ejected from the tip of the nozzle 18 in the same direction as that of the laser beam L. The cooling air supplied cools the circumference of the lens mount 20 and is discharged into ambient atmosphere through an outlet port 20a.

The cooling air and assist gas are introduced through ports 6a and 6b, respectively, on the support frame 6 and are then directed by means of a rotary joint 67 to ports 4a and 4b on the first hollow shaft 4. They are further transported through tubes 69 to ports 2b and 2c on the first rotating bracket 2, and to ports 10a and 10b on the second hollow shaft 10 by means of a rotary joint 68. Finally, they are transported through tubes 70 to be fed into 21a and 21b, respectively.

Figure 7:
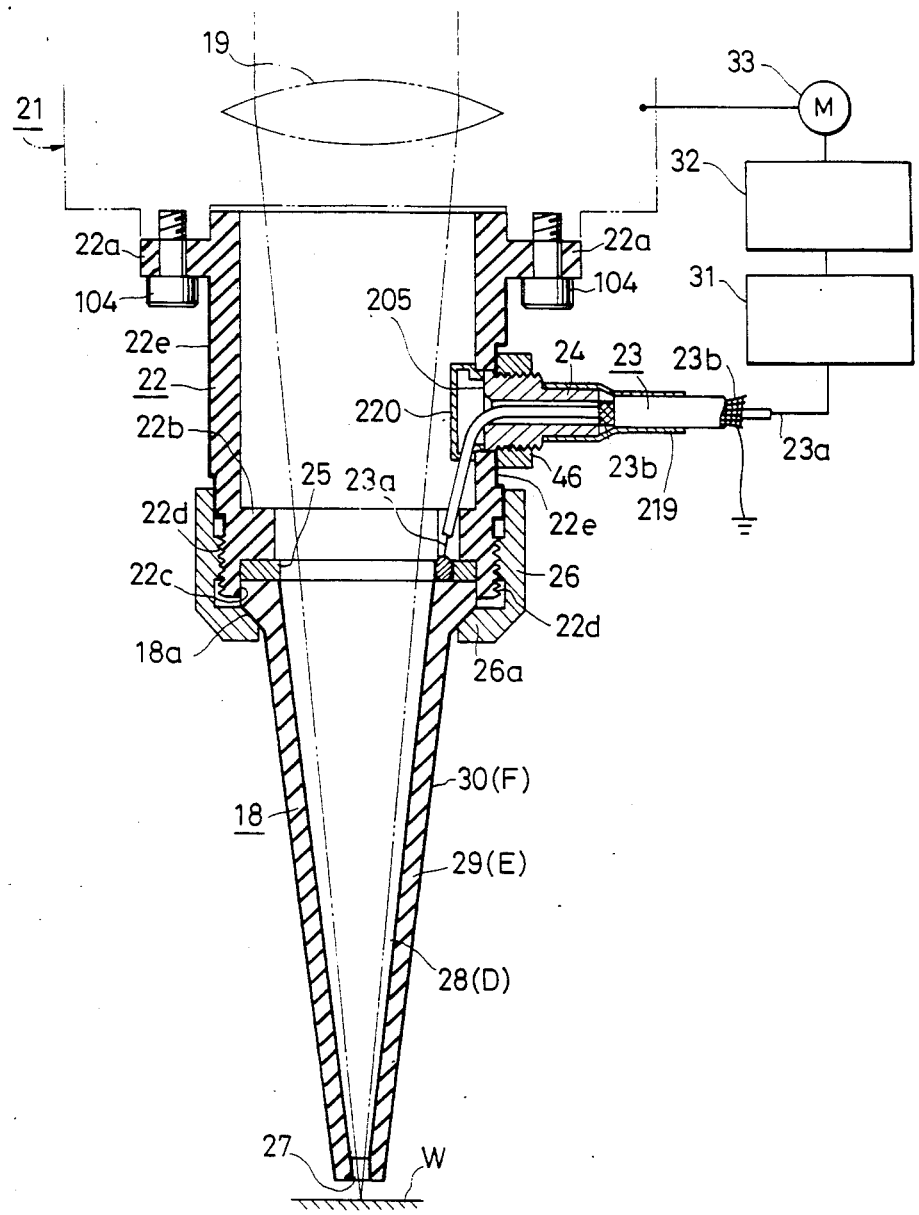
FIG. 7 is an enlarged section of the nozzle and nozzle holder according to the present invention.

The nozzle 18 is retained in a nozzle holder 22 which is secured to the housing 21. The nozzle holder 22 is formed in a cylinder of an insulating material. As shown in FIG. 6, the nozzle holder 22 is secured to a holding assist member 75 which is secured to the housing 21. That is, a flange 22a at the top end of the holder 22 is secured to the holding assist member 75 via screws 104. The holding assist member 75 has a threaded portion 75a by which it is secured to the housing 21. As shown in FIG. 7, a hole 205 is formed on one lateral side of the nozzle holder 22 and a connector 24 for a coaxial cable 23 is mounted on the holder 22 through that hole 205.

The inner periphery of the nozzle holder 22 is provided in its lower part with a small-diameter portion 22b that projects inwardly toward the center of the holder, and a nozzle fitting portion 22c is formed beneath this small-diameter portion 22b. A metallic collar 25 serving as a first conductive member that is typically made of copper is mounted on this nozzle fitting portion 22c by suitable means such as bonding. The top end face of the nozzle 18 is brought into contact with the collar 25 and a nozzle nut 26 is tightened from below so as to secure the nozzle 18 against the nozzle holder 22.

The nozzle nut 26 is typically formed of a conductive material such as aluminum and engages a threaded portion 22d formed in the outer periphery of the nozzle holder 22 in its lower part. This nozzle nut 26 has a hole in its bottom through which the nozzle is inserted and a tapered retaining surface 26a is formed in the inner periphery of this hole. By means of engagement between the retaining surface 26a and a tapered flange portion 18a formed on the outer peripheral edge of the top end of the nozzle 18, the nozzle 18 is securely fastened to the nozzle holder 22.

The nozzle 18 is in the form of an inverted hollow cone and an ejection hole 27 through which the laser beam and the assist gas are to be passed is formed in the central portion of the tip, or the lower end, of the nozzle 18.

The wall of the nozzle 18 consists of three layers which are, from the center outward, a first electrode D (28) for detecting an electrostatic characteristic between the nozzle and the work W, an insulator E (29), and a second electrode F (30) that provides an electrical (in this case, electrostatic) shield between the lateral side of the first electrode D (28) and the work W.

The nozzle 18 is formed of a nozzle substrate 29, typically made of a ceramic, with metal layers 28 and 29 that are typically made of copper or nickel. In other words, the nozzle substrate itself serves as the insulator E (29) and the first electrode D (28) which is made of the metal coat is formed continuously from the inner peripheral side of the nozzle substrate (including the inner peripheral surface of the ejection hole 27) to its tip surface, with the second electrode F (30) which is also made of the metal coat being formed to cover the outer peripheral side of the nozzle substrate 29 in such a manner that the two electrodes are insulated from each other.

The first electrode D (28) and the second electrode F (30) can be readily formed on the nozzle substrate 29 by a simple technique such as plating if they are made of coatings of the same metallic material.

Figure 8:
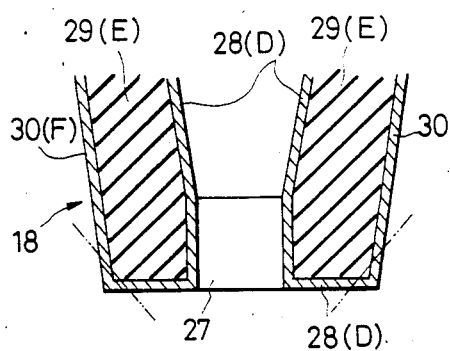
FIG. 8 is an enlarged section of the tip of the nozzle of FIG. 7 which is plated with a metal layer.
Figure 9:
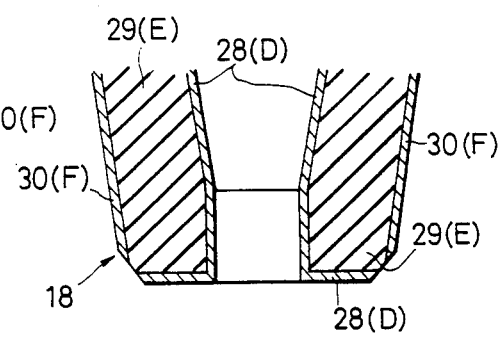
FIG. 9 is an enlarged section of the nozzle tip of FIG. 8 with its edges chamfered.

Formation of these two electrodes by plating will proceed as follows: The nozzle substrate 29 is entirely dipped in a plating bath, with part of the outer periphery of the top end of the substrate being masked. As shown in FIG. 8, the plated substrate has a continuous plating at the tip of the nozzle 18, so by chamfering the edges of the outer periphery of the nozzle 18 as indicated by the two-short-and-one-long dashed lines in FIG. 8, the plating on the tip end of the nozzle is completely separated from the plating on its lateral side on the outer periphery as shown in FIG. 9, with the result that an electrical insulation is established between the first electrode D (28) and the second electrode F (30) by means of the nozzle substrate 29 which serves as the insulator E.

The connector 24 is formed of a conductive material. As shown in FIG. 7, a strand of first electric wires 23a in a vinyl jacket which serve as the core of the coaxial cable 23 is inserted through the center of the connector 24, and a plurality of second electric wires 23b placed around the strand of wires 23a are soldered to the connector 24. The strand of electric wires 23a is passed through the nozzle holder 22 to be connected by, for example, soldering to the metallic collar 25 which connects electrically to the first electrode D (28) on the nozzle 18. The strand of first electric wires 23a which extends through the coaxial cable 23 is directed to an external electrostatic capacity sensor 31. The sensor 31 is connected to a motor drive control unit 32 comprising such devices as a C (capacitance)/V (voltage) converter and an amplifier and, on the basis of the value of capacitance detected from the first electrode D (28), the sensor 31 performs drive control on a servo motor 33 that serves as a drive unit for controlling the vertical motion of the nozzle 18, in such a manner that the lens mount 20 and the retainer tube 17, which retain the nozzle 18, can be adjustably moved in the direction of optical axis with respect to the guide tube 16.

As shown in FIG. 7, the outer peripheral surface of the nozzle holder 22 is also coated with a metal layer 22e (e.g. copper or nickel) that serves as a second conductive member. The connector 24 is electrically connected to the nozzle nut 26 via the metal layer 22e and a metal nut 46 threaded over the connector 24. The nozzle nut 26 connects electrically to the second electrode F (30) on the nozzle 18. The second electric wires 23b which connect electrically to the connector 24 are guided through the coaxial cable 23 to be connected to the ground terminal on the laser machining apparatus so that the second electrode F (30) will have the same electric potential as the work W.

The portion where the connector 24 and the coaxial cable 23 are coupled is protected with an insulating tube 219.

The nozzle 18 is mounted in the nozzle holder 22 by the following procedures: First, the connector 24, metal nut 46 and metal collar 25 are attached to the nozzle holder 22. Then, the top end of the nozzle 18 is fitted into the nozzle fitting portion 22c of the holder 22. In the next place, the nozzle nut 26 is slipped over the nozzle 18 and brought into engagement with the threaded portion 22d of the nozzle holder 22. When the nozzle nut 26 is tightened, the wedge action working between the tapered retaining surface 26a of the nut 26 and the tapered flange portion 18a of the nozzle 18 will allow the top end face of the nozzle 18 to be urged against the metal collar 25 and securely fixed in the nozzle holder 22, with the nozzle 18 being properly compensated to achieve correct centering.

The gap control, or adjustment for maintaining a constant distance between the work W and the tip of the nozzle 18 during machining, is described hereinafter.

As shown in FIG. 7, the second electrode F (30) on the nozzle 18 is grounded via a path consisting of the tapered flange portion 18a, nozzle nut 26, metal layer 22e on the nozzle holder 22, metal nut 46, connector 24 and second electric wires 23b, and has the same electric potential as the work W. The first electrode D (28) is connected to the capacitive sensor 31 via a path comprising the top end face of the nozzle 18, the metallic collar 25 and the first electric wires 23a.

When the capacitive sensor 31 detects the electrostatic capacitance $C_L$ between the W and the tip surface of the first electrode D (28), as well as the capacitance $C_A$ between the peripheral lateral surface of the first electrode D (28) and the second electrode F (30), the sum of $C_L$ and $C_A$ is sent to the motor drive control unit 32 as a signal corresponding to the amount of gap, or the distance between the tip of the nozzle 18 and the work W. The unit 32 controls the drive of servo motor 33 in such a way that the amount of the gap between the nozzle tip and the work W is held constant, with the result that the assembly of housing 21, lens mount 20 and retainer tube 17, which in combination with themselves hold the nozzle 18 in place, is adjustably moved in the direction of optical axis relative to the machining head.

Figure 10:
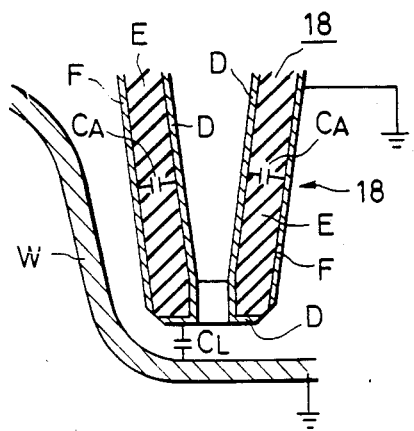
FIG. 10 is an illustration of the capacitance that occurs between the work and the nozzle during machining.
Figure 14:
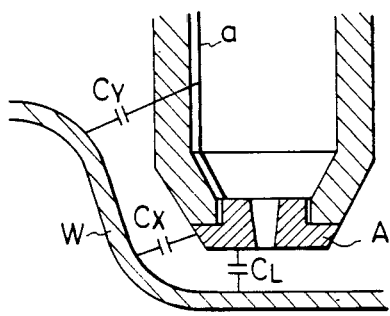
FIG. 14 is a section of a conventional art laser beam emitting nozzle.

According to the present invention, the second electrode F (30) has the same electric potential as the work W and ensures a complete electrostatic shield between the peripheral lateral side of the tip surface of the first electrode D (28) and the work W. Therefore, even if the lateral side of the nozzle 18 is brought close to the work W which, as shown in FIG. 10, has an irregular surface, the capacitance $C_A$ due to the peripheral lateral surface of the first electrode D is detected as the capacitance between the first electrode D and the second electrode F. Since the second electrode F is fixed to the nozzle 18, the value of this capacitance $C_A$ is always constant. Therefore, it will not cause any effect on the change in the capacitance $C_L$ which is to be detected with the capacitive sensor 31. As a consequence, the sensor 31 is capable of providing a correct capacitance measurement corresponding to the amount of the gap between the nozzle tip and the work.

In this connection, it should be noted that since the tip surface of the first electrode D is very thin, the capacitance detected from the lateral side of this electrode at the tip of the nozzle 18 is too small to affect the correct gap measurement.

Figure 5:
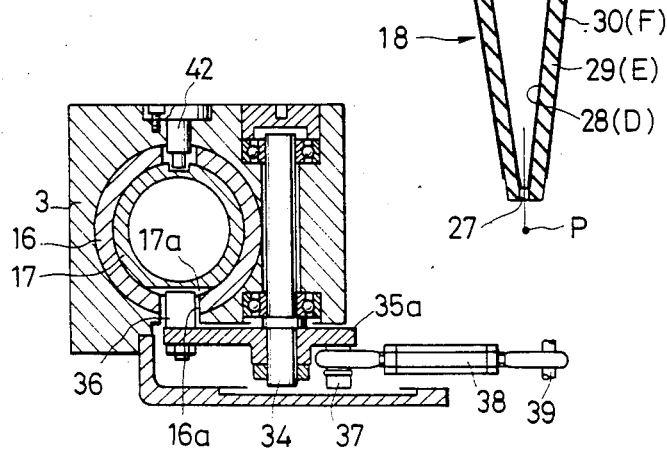
FIG. 5 is a cross-sectional view showing how a nozzle-retaining tube, a guide tube and a link mechanism are coupled in the machining head.

The mechanism of adjusting the position of the retainer tube 17 by moving it in the direction of optical axis for the purpose of achieving gap control is hereunder described in greater detail. As shown in FIGS. 3 and 5, a fulcrum pin 34 is erected outside the second rotating bracket 3, and a lever 35 is rotatably supported on this pin 34 which is inserted in a substantially central portion of the lever 35. A pin 36 is fixed at one end of the lever 35 and as shown in FIGS. 4 and 5, the front end of the pin 36 is fitted into a rectangular groove 17a in the retainer tube 17 via a slot 3a in the second rotating bracket 3 and a slot 16a in the guide tube 16. The slots 3a and 16a are elongated in the direction of optical axis and made slightly larger than the pin 36. Because of this arrangement, when the lever 35 is pivoted about the pin 34, the retainer tube 17 will be moved in the direction of optical axis by means of pin 36.

As shown in FIGS. 3 and 5, a tab 35a is formed in the top central portion of the lever 35 and one end of a linking rod 38 having an adjustable length is coupled to the tab 35a in such a way that it is pivotable about a pin 37. The combination of the linking rod 38 and the lever 35 provides a link mechanism. As shown in FIG. 4, the other end of the linking rod 38 is connected via a pin 39 to the eccentric position of a worm wheel 40, or the vicinity of its peripheral edge. The worm wheel 40 has a substantially semicircular form and is always in mesh with a worm 41 that serves as the output shaft of the servo motor 33. Because the worm 41 is in mesh with the worm wheel 40, the driving power supplied from the servo motor 33 is considerably decelerated when it is transmitted to the linking rod 38 and the lever 35. A sensor 45 is provided coaxially with the worm wheel 40 for the purpose of detecting the rotating angle of the worm wheel 40, or the amount of displacement of the retainer tube 17. In FIG. 5, the numeral 42 denotes a pin for preventing the retainer tube 17 from turning in the guide tube 16.

The servo motor 33 is mounted on top of the second rotating bracket 3 with the aid of a mounting bracket 43 and, as shown in FIGS. 3 and 4, the motor 33 is disposed in the intermediate space 44 between the first rotating bracket 2 and the second rotating bracket 3. Since no extra space for accommodating the servo motor 33 is required, the laser machining apparatus of the present invention can be constructed in a compact size. In addition, the servo motor 33 is not disposed on the lateral side of the retainer tube 17 and instead is mounted away from the nozzle 18 and on the side which does not face the work W. Therefore, the servo motor 33 will not interfere with the work W in whichever direction the nozzle 18 is positioned with respect to the work W.

The laser beam machining apparatus of the present invention constructed as above operates as follows. The control unit 66 executes a control program that has been fed with positional data for the five axes, X, Y, Z, A and B, as a result of teaching or other preliminary operations on the work W. The machining head 1 moves over the surface of the work W following the machining point along predetermined paths in the directions of X, Y and Z axes, with the direction of the nozzle being changed in accordance with the control of the first and second axes A and B.

A laser beam L emitting from the laser oscillator 56 is deflected downwardly by the beam bender 71. Thereafter, as shown in FIG. 4, the beam is incident on top of the first hollow shaft 4 to travel along the first axis A, reflected by the reflective mirror 47 in the first rotating bracket 2, and is further reflected by the sideway reflective mirror 48 toward the second axis B. The beam L travels along the axis B and is reflected by the reflective mirror 49 which is mounted on the second bracket 3. The beam is further reflected by the reflective mirror 50 to be directed through the light-concentrating means 15 to reach the nozzle 18, from which it is projected at a point P of the work W to be machined.

According to the present invention, the rotation of the two servo motors 9 and 14 provides various combinations of the rotational angles of the first and second hollow shaft 4 and 10, or the rotational angles of the first and second rotating brackets 2 and 3, and this enables the laser beam L to be projected onto the predetermined point of the work W at any angle in the space. Irrespective of the angle at which it is projected, the laser beam L is focused at the predetermined point P on the center line (first axis A) through the first hollow shaft 4 so as to achieve correct machining of the work W.

Having the construction described above, the machining head 1 enables the laser beam L to be projected in any direction independently of the positional data for the work W. Stated more specifically, the first and second axes A and B can be controlled independently of the machining tracks (X, Y and Z values) predetermined for the work W, and the changes in the rotational angles of these axes A and B will cause no effects on the data for the machining tracks.

Also, according to the present invention, the amount of the gap between the tip of the nozzle 18 and the surface of the work W is always detected on the basis of the value of capacitance detected from the first electrode 28 on the tip of the nozzle 18, and an electrical signal according to the detected capacitance is transmitted to the servo motor 33. As a result, the retainer tube 17 is moved by the transmission mechanism consisting of the worm 41 serving as the output shaft of the motor 33, the worm wheel 40 which is always in mesh with the worm 41, the pin 39, the rod 38, and the lever 35. This movement of the tube 17 enables the height of the nozzle 18 relative to the work W to be adjusted for the proper value. If the detected amount of gap is greater than a predetermined amount, the worm wheel 40 causes, via the linking rod 38, the lever 35 to be pivoted counterclockwise at one end, and the other end of the lever 35 pushes the retainer tube 17 downward in such a direction that the amount of gap is decreased. If, on the other hand, the detected amount of gap is smaller than the predetermined amount, the servo motor 33 rotates in the reverse direction to cause, via the rod 38, the lever 35 to be pivoted clockwise so that the tube 17 is pulled upward in such a direction that the amount of gap is increased. In this way, the amount of gap between the nozzle tip and the work W can always be held constant while accomplishing correct beam focusing adjustment at the same time.

Figure 13:
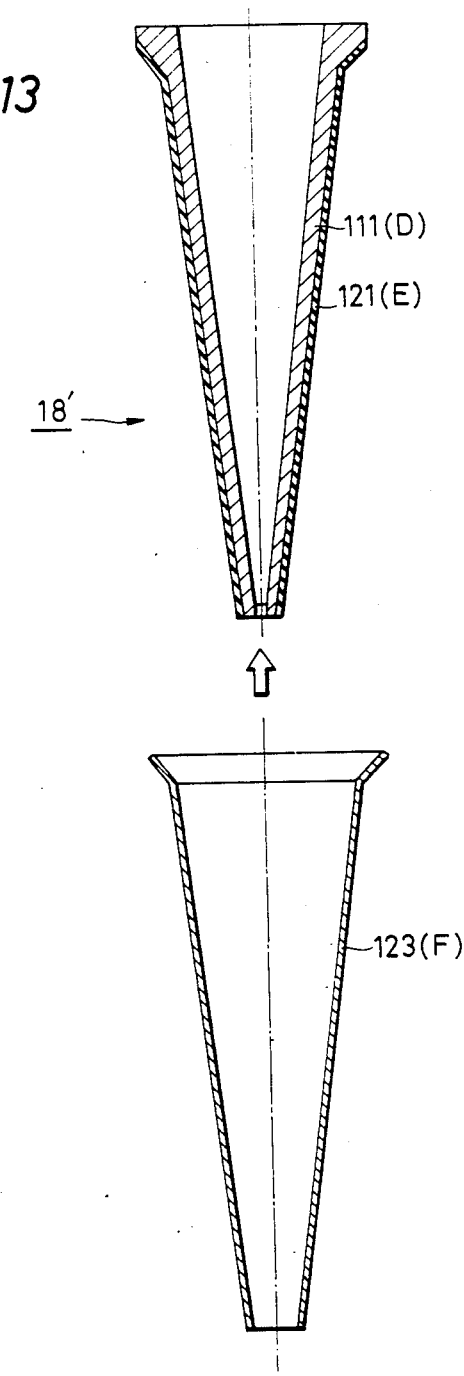
FIG. 13 is a section showing another modification of the nozzle in an unassembled state.

A modification of the nozzle 18 used in the machining head of the present invention is hereinafter described with reference to FIGS. 11 and 13, in which the same components as those shown in FIG. 7 are identified by like numerals and will not be explained in detail.

Figures 11, 12:
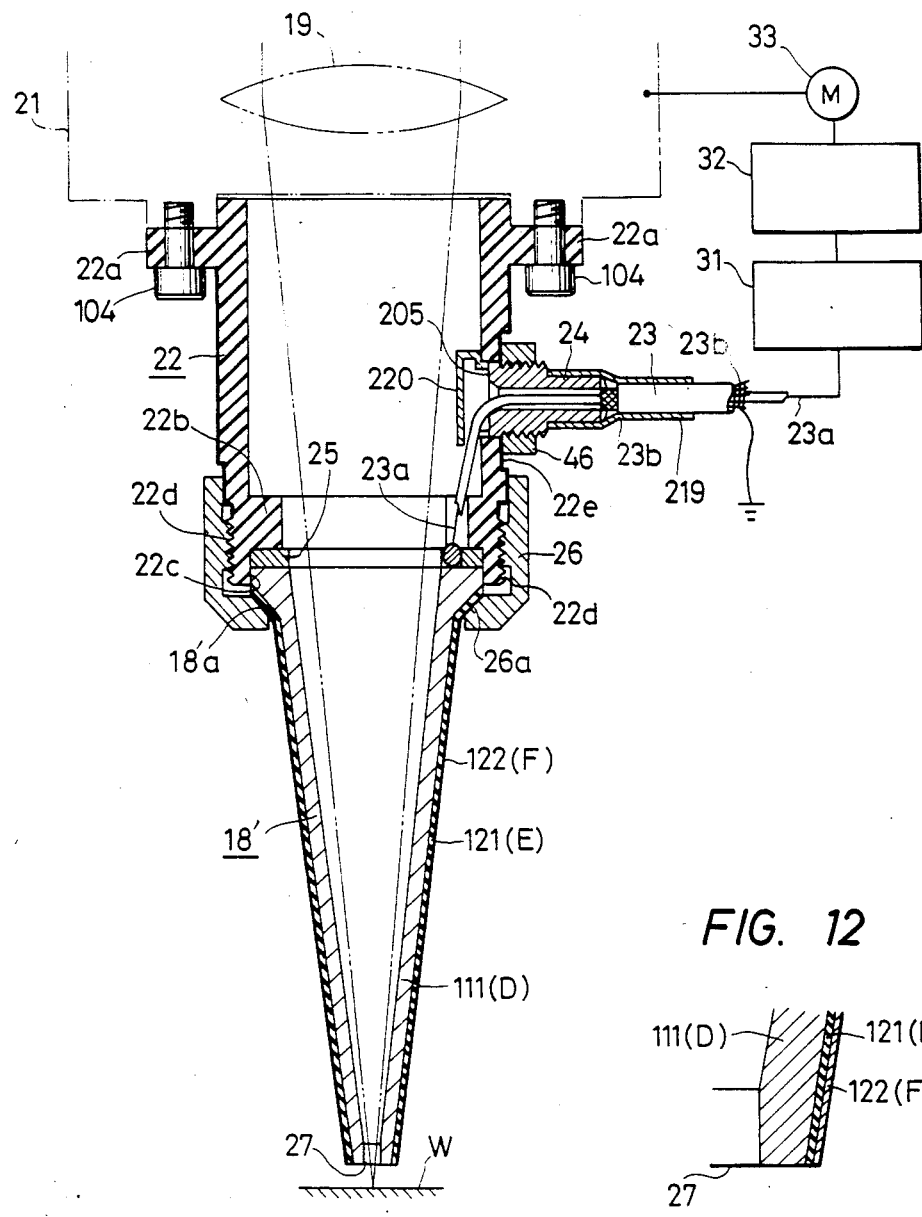
FIG. 11 is a section of a modification of the laser-emitting nozzle according to the present invention.
FIG. 12 is an enlarged section of the tip of the nozzle of FIG. 11.

As shown in FIGS. 11 and 12, a modified nozzle 18' also consists of a first electrode D, an insulator E, and a second electrode F. The first electrode D is formed of a nozzle substrate 111 that is made of a conductive material such as copper or nickel. The insulator E is formed on the outer peripheral side of the first electrode D by coating it with an insulation film 121 that may be formed of flame-sprayed ceramic. The second electrode F is formed on the outer peripheral side of the insulator E by coating it with a metal film 122 that may be formed of flame-sprayed copper or nickel. In this modification, no coating is applied to either the periphery of the top end of the nozzle substrate 111 or its bottom end, and as shown in FIG. 12, the electrical insulation between the first electrode D and the second electrode F is ensured by the intermediate insulator E.

When the nozzle 18' is mounted on the nozzle holder 22 in the manner already described, the top end face of the first electrode D comes in contact with the metal collar 25 as shown in FIG. 11, and it is connected to the capacitive sensor 31 via the strand of first electric wires 23a while the second electrode F is grounded via a path consisting of the nozzle nut 26, the metal layer 22e on the nozzle holder 22, the metal nut 46, the connector 24 and the second electric wires 23b.

As in the embodiment already described, the capacitance between the first electrode D and the second electrode F is held constant throughout the machining operation, so that only the change in the capacitance between the bottom end face, or the tip, of the nozzle 18' and the work W is detected by the sensor 31 as the change in the nozzle-to-work gap. As a result, gap control can be achieved in an exact manner even if the work W has an irregular surface.

The second electrode F need not be formed by flame-spraying of the metal coat 122. In an alternative method, a metal cap 123 having the same shape as the metal coat 122 is separately prepared and, after an insulation coat 121 serving as the insulator E is flame-sprayed onto the nozzle substrate 111 serving as the first electrode D, the metal cap 123 is fitted over the so treatment coat 121 to form the intended second electrode F. In this case, a sliding property is retained at the interface between the insulator E and the second electrode F, so that even if these members are made of materials having different thermal expansion coefficients (e.g. ceramic as insulator E and copper as second electrode F), they can undergo deformation without interfering with each other and thereby preventing separation or cracking of the ceramic layer (insulator E). In addition, compared with the case of forming the second electrode by flame-spraying of a metal, the nozzle has more uniformity in insulation resistance and, hence, in product quality. A further advantage is that even if flaws or some other damage develops in the outer surface of the nozzle 18', it can be readily repaired by simply replacing the metal cap 123.

As described on the foregoing pages, the laser machining apparatus of the present invention enables the attitude of the laser-projection nozzle to be altered in any direction about the focal point P of the laser beam by simply controlling two axes with respect to the work having a curved surface. In other words, the attitude of the nozzle can be freely adjusted independently of any of the machining positions in X, Y and Z directions that are predetermined for the work.

In the machining head of the laser machining apparatus of the present invention, the drive unit associated with nozzle control is provided on the second rotating bracket and accommodated in the space between the first and second rotating brackets. In contrast with the conventional art system, no drive unit need to be mounted at the tip of the nozzle, with the subsequent result that no weight is exerted on the nozzle tip. In addition, no extra space is required for accommodating the drive unit associated with the control of the retainer tube and this permits the laser machining apparatus to be constructed in a compact size. As a further advantage, the drive unit associated with the control of the retainer tube is mounted not on the lateral side of the nozzle retaining tube but on the side that is away from the nozzle and which does not face the work, so that the drive unit can be operated without interfering with the work at any time of the machining operation. The link mechanism for connecting the retainer tube to the drive unit associated with the control of the tube is disposed outside of the second rotating bracket, so it will not be distorted by the heat of the laser beam while achieving power transmission in a reliable manner, with subsequent improvement in its durability. A further advantage is that fine adjustment of the nozzle height can be accomplished using a simple construction and without the need to employ a complex control system.

As also described in the foregoing, according to the present invention, the wall of the laser beam emitting nozzle consists of three layers which are, from the center outward, a first electrode for detecting an electrostatic capacitance, an insulator, and a second electrode, and the peripheral lateral side of the first electrode except the tip end face of the nozzle is electrically shielded from the work by means of the second electrode, so that a constant electrostatic capacitance can always be detected from the lateral side of the first electrode. Therefore, even in the case of machining a work having a complexly curved surface, the change in the electrostatic capacitance between the nozzle tip and the work can be detected in an exact manner. By controlling the height of the nozzle in such a way that the detected electrostatic capacitance is held constant, the laser beam can always be focused at the surface of the work so that optimum conditions can be maintained throughout the machining operations to provide improved precision in machining.

If the insulator portion of the nozzle is formed of a ceramic substrate and if the first electrode is formed by applying a metal coat to the inner peripheral side and tip surface of the substrate, with the second electrode being formed by applying a second metal coat to the outer peripheral side of the substrate, a very lightweight nozzle will result because of the nature of the ceramic used as the material of the insulator. In addition, the first and second electrodes can be simply coated on the nozzle substrate by plating instead of embedding them in the substrate, and this contributes to a marked increase in the production rate of nozzles.

The first electrode at the nozzle tip is so thin that the electrostatic capacitance detected from the thickness of this electrode is negligible and small enough to ensure correct detection of the amount of the gap between the nozzle tip and the work. Furthermore, the inner surface of the nozzle which is covered with a metal coat has such good light reflectivity and thermal conductivity that the nozzle can be completely protected from laser light.

In another embodiment, the nozzle substrate may be formed as the first electrode and the insulating portion is formed on the outer peripheral lateral surface of the substrate by applying an insulator coat that is typically made of a ceramic, with the second electrode being formed on the outer lateral side of said insulator coat by applying a metal coat that is typically made of a copper material. Since the inner surface of the nozzle is metallic, it has not only high light reflectivity but also good thermal conductivity that local concentration of heat is less likely to occur and the nozzle will not be easily deformed by the heat of laser light. In addition an electrostatic barrier wall can be readily formed on the lateral side of the nozzle by simply flame-spraying the insulation coat and the metal coat placed in superimposition on the nozzle substrate which is typically made of a copper material, and this also contributes to a marked increase in the production rate of nozzles.

According to another alternative method for making a three-layered nozzle the second electrode in the form of a metal cap is fitted over the first electrode on which an insulation coat has been flame-sprayed. In this case, even if the insulation coat and the metal cap expand thermally at different coefficient, they will slide at their interface without interfering with each other and thereby preventing separation or cracking of the insulation coat. In addition, compared with the case of forming the second electrode by flame-spraying of a metal, the nozzle has more uniformity in insulation resistance and, hence, in product quality. A further advantage is that even if flaws or some other damage develops in the outer surface of the nozzle, it can be readily repaired by simply replacing the metal cap.

Furthermore, according to the present invention, a nozzle equipped with a first electrode that connects electrically to a first conductive member (which is connected to an electrostatic capacitance sensor) and which detects the electrostatic capacitance between the nozzle tip and the work and with a second electrode that connects electrically to a second conductive member (which is connected to the same electric potential as that of the work) and which provide an electric shield between the lateral side of the first electrode and the work is detachably mounted in a nozzle holder that is equipped with said first and second conductive members, and the amount of the gap between the nozzle tip and the work is controlled based on the electrostatic capacitance detected by said sensor. Since the lateral side of the first electrode is electrically shielded from the work by the second electrode, a constant capacitance can always be detected from the lateral side of the first electrode. As a result, even in the case of machining a work having a complexly curved shape, the change in the electrostatic capacitance between the nozzle tip and the work can be detected in an exact manner. By controlling the position of the nozzle holder in such a way that the detected electrostatic capacitance is held constant, optimum conditions can be maintained throughout the machining operation and improved precision in machining can be attained by, for example, allowing the laser light to be always focused at the surface of the work.

By simply fitting the top end of the nozzle into the nozzle holder and then tightening a nozzle nut that engages the flange portion of the nozzle and which meshes with the threaded portion of the nozzle holder, the first electrode on the nozzle gains intimate electrical connection with the first conductive member, and the second electrode with the second conductive member. In this way, the nozzle is correctly and securely fixed in the nozzle holder in its nozzle fitting portion. Since wiring operations are not necessary for each nozzle replacement, the present invention ensures that nozzles can be mounted and dismounted very simply, thereby permitting rapid and easy nozzle change or replacement.

A further advantage of the present invention is that it provides for great simplicity in nozzle fabrication since no threaded portion need be formed in the nozzle itself and nozzles which will wear rapidly due to damage or some other reasons can be provided at a very low cost. The absence of the need for threading on the nozzle offers a particularly great benefit to the manufacture of ceramic nozzles which are chiefly used to take advantage of the lightweightness of ceramics.

The foregoing preferred embodiments of the invention are set forth herein by way of illustration and are not intended to limit the scope of the invention as defined in the claims appended hereto. Other embodiments as well as variations and modifications of the embodiments disclosed herein should be readily apparent to those skilled in the art based on the teachings herein and those other embodiments and variations and modifications of embodiments are intended to be with the scope of the appended claims.

What is claimed is:

1. A laser beam machining apparatus comprising:
   a head supporting member;
   a first rotating bracket member for guiding a laser beam, said first rotating member being supported on said head supporting member and rotatable about a first axis with respect to said head supporting member;
   a second rotating bracket member for guiding said laser beam from said first rotating bracket member, said second rotating bracket member being supported on said first rotating bracket member and rotatable with respect to said first rotating bracket member about a second axis, said second axis crossing said first axis at a fixed point with a predetermined angle;
   laser beam concentrating means for concentrating the laser beam entering from said second bracket member and projecting the beam to the fixed point where the first axis crosses the second axis;
   retainer means for retaining said laser beam concentrating means, said retainer means being movable with respect to said second rotating bracket member in an optical axis direction of the laser beam passed through said laser beam concentrating means, to thereby perform focusing adjustment of the beam on a workpiece to be machined;
   a nozzle member for projecting out the laser beam concentrated by said concentrating means and detecting a distance between said nozzle and said workpiece to be machined, said nozzle member being retained in said retainer means, said nozzle member comprising:

a first electrode layer for detecting electrostatic capacitance between a tip end of said first electrode layer and the workpiece, said first electrode layer extending along an inner side portion of the nozzle member to a tip end portion thereof;

a second electrode layer for electrically shielding a side portion of said first electrode layer from the workpiece, said second electrode layer being provided on an outer lateral side portion, except the tip end portion of said first electrode layer; and an insulating layer provided between said first and second electrode layers for electrically insulating said first and second electrode layers from each other.

2. A laser beam machining apparatus of claim 1, further comprising:

means for moving said retainer means with respect to said second rotating bracket member in response to the distance detected by said nozzle member so that the distance may be adjusted.

3. A laser beam machining apparatus of claim 2, wherein said nozzle member first electrode layer detects electrostatic capacitance between said nozzle member and the workpiece, and said apparatus further comprises means responsive to the electrostatic capacitance detected by said nozzle member detecting means for moving said retainer means with respect to said second rotating bracket member.

4. A laser beam machining apparatus of claim 3, wherein said second electrode layer is electrically connected to a point having the same electric potential with the workpiece to thereby have the same electric potential with the workpiece.

5. A laser beam machining apparatus of claim 3, wherein said first and second electrode layers comprise coated layers of metal.

6. A laser beam machining apparatus of claim 3, wherein said insulating layer comprises a coating of insulative material and said second electrode layer comprises a coating of metal.

7. A laser beam machining apparatus of claim 4, wherein said second electrode layer comprises a cap member made of metal.

8. A laser beam machining apparatus of claim 4, wherein said insulating layer is formed from ceramic material.

9. A laser beam machining apparatus comprising:
a head supporting member;
a first rotating bracket member for guiding a laser beam, said first rotating member being supported on said head supporting member and rotatable about a first axis with respect to said head supporting member;
a second rotating bracket member for guiding said laser beam from said first rotating bracket member, said second rotating bracket member being supported on said first rotating bracket member and rotatable with respect to said first rotating bracket member about a second axis, said second axis crossing said first axis at a fixed point with a predetermined angle;
laser beam concentrating means for concentrating the laser beam entering from said second bracket member and projecting the beam to the fixed point where the first axis crosses the second axis;

retainer means for retaining said laser beam concentrating means, said retainer means being movable with respect to said second rotating bracket member in an optical axis direction of the laser beam passed through said laser beam concentrating means, to thereby perform focusing adjustment of the beam on a workpiece to be machined;

a nozzle member for projecting out the laser beam concentrated by said concentrating means, said nozzle member being retained in said retainer means, said nozzle member comprising means for detecting a distance between said nozzle member and the workpiece;

means for moving said retainer means with respect to said second rotating bracket member in response to the distance detected by said nozzle member so that the distance may be adjusted, said nozzle member comprising:

a first electrode layer for detecting electrostatic capacitance between a tip end of said first electrode layer and the workpiece, said first electrode layer extending along an inner side portion of the nozzle body to the tip end portion thereof;

a second electrode layer for electrically shielding a side portion of said first electrode layer from the workpiece, said second electrode layer being provided on an outer lateral side portion, except the tip end portion of said first electrode layer; and an insulating layer provided between said first and second electrode layers for electrically insulating said first and second electrode layers from each other;

a nozzle holder for holding said nozzle member, said nozzle holder having, at its lower inner peripheral portion, a nozzle fitting portion fitted with said nozzle member, and, at its lower outer peripheral portion, a threaded portion;

a first conductive member provided at said nozzle fitting portion of said nozzle holder, said first conductive member being electrically connected with an electrostatic capacitance sensing means for producing a signal corresponding to the electrostatic capacitance detected by said nozzle member;

a second conductive member provided on an outer peripheral portion of said nozzle holder, said second conductive member being electrically connected with the workpiece to thereby have the same electric potential as the workpiece; and a nozzle nut member engaged with a portion of said nozzle member and meshed with said threaded portion of said nozzle holder to thereby fasten said nozzle member to said nozzle fitting portion of said nozzle holder, and wherein said first electrode layer of said nozzle member is electrically connected with said first conductive member and said second electrode layer of said nozzle member is electrically connected with said second conductive member via said nut member when said nozzle member is fastened to said nozzle holder via said nozzle nut member.

10. A laser beam machining apparatus of claim 9, wherein said retainer moving means comprises:

driving means for driving said retainer means, said driving means being provided on said second bracket member in a space formed between said first and second rotating bracket members;

link mechanism for connecting said driving means and said retainer means, said link mechanism being provided on said second rotating bracket member outside thereof.

11. A laser machining apparatus of claim 10, wherein said driving means includes means for controlling the drive of said retainer means in response to the signal generated by the electrostatic sensing means, to thereby maintain constant the electrostatic capacitance between said nozzle member and the workpiece.

12. A laser beam machining apparatus comprising:
a head supporting member;
a first rotating bracket member for guiding a laser beam, said first rotating member being supported on said head supporting member and rotatable about a first axis with respect to said head supporting member;
a second rotating bracket member for guiding said laser beam from said first rotating bracket member, said second rotating bracket member being supported on said first rotating bracket member and rotatable with respect to said first rotating bracket member about a second axis, said second axis crossing said first axis at a fixed point with a predetermined angle;
laser beam concentrating means for concentrating the laser beam entering from said second bracket member and projecting the beam to the fixed point where the first axis crosses the second axis;
retainer means for retaining said laser beam concentrating means, said retainer means being movable with respect to said second rotating bracket member in an optical axis direction of the laser beam passed through said laser beam concentrating means, to thereby perform focusing adjustment of the beam on a workpiece to be machined;
a nozzle member for projecting out the laser beam concentrated by said concentrating means, said nozzle member being retained in said retainer means, said nozzle member detecting a distance between said nozzle member and the workpiece;
means for moving said retainer means with respect to said second rotating bracket member in response to the distance detected by said nozzle member so that the distance may be adjusted, and wherein said retainer moving means comprises:
driving means for driving said retainer means, said driving means being provided on said second bracket member in a space formed between said first and second rotating bracket members; and
a link mechanism for connecting said driving means and said retainer means, said link mechanism being provided on said second rotating bracket member, outside thereof.

13. A laser beam machining apparatus comprising:
a head supporting member;
a first rotating bracket member for guiding a laser beam, said first rotating member being supported on said head supporting member and rotatable about a first axis with respect to said head supporting member;
a second rotating bracket member for guiding said laser beam from said first rotating bracket member, said second rotating bracket member being supported on said first rotating bracket member and rotatable with respect to said first rotating bracket member about a second axis, said second axis crossing said first axis at a fixed point with a predetermined angle;
laser beam concentrating means for concentrating the laser beam entering from said second bracket member and projecting the beam to the fixed point where the first axis crosses the second axis;
retainer means for retaining said laser beam concentrating means, said retainer means being movable with respect to said second rotating bracket member in an optical axis direction of the laser beam passed through said laser beam concentrating means, to thereby perform focusing adjustment of the beam on a workpiece to be machined;
a nozzle member for projecting out the laser beam concentrated by said concentrating means, said nozzle member being retained in said retainer means, said nozzle member comprising means for detecting a distance between said nozzle member and the workpiece;
means for moving said retainer means with respect to said second rotating bracket member in response to the distance detected by said nozzle member so that the distance may be adjusted, wherein said nozzle member comprises:
means for detecting electrostatic capacitance between said nozzle member and the workpiece, and said apparatus further comprises means responsive to the electrostatic capacitance detected by said nozzle member detecting means for moving said retainer means with respect to said second rotating bracket member, and wherein said retainer moving means comprises:
driving means for driving said retainer means, said driving means being provided on said second bracket member in a space formed between said first and second rotating bracket members; and
a link mechanism for connecting said driving means and said retainer means, said link mechanism being provided on said second rotating bracket member outside thereof; and
wherein said driving includes means for controlling the drive of said retainer means in response to the signal generated by the electrostatic capacitance detecting means, to thereby maintain constant the electrostatic capacitance between said nozzle member and the workpiece.

14. A laser machining nozzle for detecting a distance between said nozzle and a workpiece to be machined, comprises:
a first electrode layer for detecting electrostatic capacitance between the tip end of said first electrode layer and the workpiece, said first electrode layer extending along an inner side portion of the nozzle body to a tip end portion thereof;
a second electrode layer for electrically shielding a lateral side portion of said first electrode layer from the workpiece, said second electrode layer being provided on the outer lateral side portion, except the tip end portion, of said first electrode layer; and
an insulating layer provided between said first and second electrode layers for electrically insulating said first and second electrode layers from each other.

15. A laser machining nozzle of claim 14, wherein said second electrode layer is electrically connected to the workpiece to thereby have the same electric potential as the workpiece.

16. A laser machining nozzle of claim 14, wherein said first and second electrode layers comprise coated layers of metal.

17. A laser machining nozzle of claim 14, wherein said insulating layer comprises a coating of insulative material and said second electrode layer comprises a coating of metal.

18. A laser machining nozzle of claim 14, wherein said second electrode layer comprises a cap member made of metal.

19. A laser machining nozzle of claim 14, wherein said insulating layer is formed from ceramic material.

* * * * *

UNITED STATES PATENT AND TRADEMARK OFFICE
CERTIFICATE OF CORRECTION

PATENT NO. : 4,794,222

DATED : December 27, 1988

INVENTOR(S) : Manabu Funayama, Yoshinobu Sawada

It is certified that error appears in the above-identified patent and that said Letters Patent is hereby corrected as shown below:

On the title page, item [73], should read
--[73] Assignee: Nippei Toyama Corporation
                  Tokyo, Japan--

Signed and Sealed this

Twenty-sixth Day of December, 1989

*Attest:*

JEFFREY M. SAMUELS

*Attesting Officer*   *Acting Commissioner of Patents and Trademarks*